(12) United States Patent
Kojima

(10) Patent No.: US 12,104,946 B2
(45) Date of Patent: Oct. 1, 2024

(54) OPTICAL FIBER SENSING SYSTEM, ACTION SPECIFYING APPARATUS, ACTION SPECIFYING METHOD, AND COMPUTER READABLE MEDIUM

(71) Applicant: NEC Corporation, Tokyo (JP)

(72) Inventor: Takashi Kojima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 425 days.

(21) Appl. No.: 17/430,543

(22) PCT Filed: Feb. 15, 2019

(86) PCT No.: PCT/JP2019/005523
§ 371 (c)(1),
(2) Date: Aug. 12, 2021

(87) PCT Pub. No.: WO2020/166057
PCT Pub. Date: Aug. 20, 2020

(65) Prior Publication Data
US 2022/0128396 A1    Apr. 28, 2022

(51) Int. Cl.
*G01H 9/00* (2006.01)
*G08B 13/10* (2006.01)
*G08B 13/186* (2006.01)

(52) U.S. Cl.
CPC ............. *G01H 9/004* (2013.01); *G08B 13/10* (2013.01); *G08B 13/186* (2013.01)

(58) Field of Classification Search
CPC ....... G01H 9/004; G08B 13/10; G08B 13/186
See application file for complete search history.

(56) References Cited

U.S. PATENT DOCUMENTS 7,123,785 B2 * 10/2006 Iffergan ............... G08B 13/124
356/73.1
9,000,918 B1    4/2015 McLaughlin et al.
(Continued)

FOREIGN PATENT DOCUMENTS

CN    101388130 A    3/2009
CN    202205306 U    4/2012
(Continued)

OTHER PUBLICATIONS

Japanese Office Action for JP Application No. 2023-024741 mailed on Nov. 28, 2023 with English Translation.
(Continued)

*Primary Examiner* — Daniel Petkovsek
(74) *Attorney, Agent, or Firm* — Sughrue Mion, PLLC

(57) ABSTRACT

An optical fiber sensing system according to the present disclosure includes: a cable (20) including optical fibers; a reception unit (31) configured to receive, from at least one optical fiber included in the cable (20), an optical signal on which a vibration detected in each of a plurality of locations on the cable (20) is superimposed; and an action specifying unit (32) configured to specify, based on the optical signal, a location on the cable (20) in which the vibration has been detected and specify an action of a target to be monitored which has caused the vibration, in which the action specifying unit (32) specifies a detection pattern that is used to specify the action of the target to be monitored depending on the environment of the location on the cable (20) in which the vibration has been detected.

16 Claims, 6 Drawing Sheets

(56) References Cited

U.S. PATENT DOCUMENTS

| | | | | |
|---|---|---|---|---|
| 2005/0207000 | A1* | 9/2005 | Ooaku | G08B 13/126 |
| | | | | 359/341.41 |
| 2006/0197665 | A1 | 9/2006 | Shibata et al. | |
| 2016/0086459 | A1 | 3/2016 | Puzrin et al. | |
| 2016/0334543 | A1* | 11/2016 | Nagrodsky | B61L 1/06 |

FOREIGN PATENT DOCUMENTS

| | | |
|---|---|---|
| CN | 102982639 A | 3/2013 |
| CN | 103606236 A | 2/2014 |
| CN | 104599419 A | 5/2015 |
| CN | 205857906 U | 1/2017 |
| CN | 106683308 A | 5/2017 |
| CN | 106875603 A | 6/2017 |
| EP | 2846316 A1 | 3/2015 |
| JP | 2003-284053 A | 10/2003 |
| JP | 2005-032224 A | 2/2005 |
| JP | 2005345137 A | 12/2005 |
| JP | 2006-058102 A | 3/2006 |
| JP | 2006-172339 A | 6/2006 |
| JP | 2006208061 A | 8/2006 |
| JP | 2009122994 A | 6/2009 |
| WO | 2014170013 A1 | 10/2014 |

OTHER PUBLICATIONS

International Search Report for PCT Application No. PCT/JP2019/005523, mailed on Mar. 19, 2019.

Bangladeshi Office Communication for Bangladeshi application No. 42/2020/867 dated Feb. 7, 2021.

JP Office Action for JP Application No. 2023-024741, mailed on Feb. 20, 2024 with English Translation.

* cited by examiner

| DISTANCE FROM OPTICAL FIBER DETECTION UNIT | ENVIRONMENT |
|---|---|
| x1~x2 m | ABOVE GROUND |
| x2~x3 m | IN GROUND |
| x3~x4 m | ABOVE GROUND |

OPTICAL FIBER SENSING SYSTEM, ACTION SPECIFYING APPARATUS, ACTION SPECIFYING METHOD, AND COMPUTER READABLE MEDIUM

This application is a National Stage Entry of PCT/JP2019/005523 filed on Feb. 15, 2019, the contents of all of which are incorporated herein by reference, in their entirety.

TECHNICAL FIELD

The present disclosure relates to an optical fiber sensing system, an action specifying apparatus, an action specifying method, and a computer readable medium.

BACKGROUND ART

In recent years, a system for monitoring states of targets to be monitored (mainly, persons) who are in a fence and in the vicinity of the fence using optical fibers has been proposed (e.g., Patent Literature 1). According to the technique disclosed in Patent Literature 1, optical fibers are laid down in a fence, and vibrations generated in the fence due to an intruder climbing or using a ladder to climb the fence are detected.

CITATION LIST

Patent Literature

[Patent Literature 1] Japanese Unexamined Patent Application Publication No. 2006-208061

SUMMARY OF INVENTION

Technical Problem

However, the technique disclosed in Patent Literature 1 is configured to determine the states of the targets to be monitored who are in the fence and in the vicinity of the fence based on a rough reference such as the magnitude of vibrations. With this configuration, only a simple state can be detected.

On the other hand, it is expected that pattern sensing that uses dynamic patterns of optical fiber sensing will be performed in the future as a technique for detecting the state of the target to be monitored in more detail.

Vibration data that can be detected by optical fiber sensing has unique patterns according to an action of the target to be monitored. It is possible to specify the action of the target to be monitored by analyzing the dynamic change of these patterns.

In the pattern sensing using a dynamic pattern of the optical fiber sensing, however, the way in which the vibration or the like is transmitted is changed if the environment in which the optical fiber cable is laid down is changed and the accuracy of the detection may be reduced.

An object of the present disclosure is to provide an optical fiber sensing system, an action specifying apparatus, an action specifying method, and a computer readable medium capable of solving the aforementioned problems and performing higher-level specification of the action of the target to be monitored in a more flexible way.

Solution to Problem

An optical fiber sensing system according to one aspect includes:
a cable including optical fibers;
a reception unit configured to receive, from at least one optical fiber included in the cable, an optical signal on which a vibration detected in each of a plurality of locations on the cable is superimposed; and
an action specifying unit configured to specify, based on the optical signal, a location on the cable in which the vibration has been detected and specify an action of a target to be monitored which has caused the vibration,
in which the action specifying unit specifies a detection pattern that is used to specify the action of the target to be monitored depending on the environment of the location on the cable in which the vibration has been detected.

An action specifying apparatus according to one aspect includes:
a reception unit configured to receive, from at least one optical fiber included in a cable, an optical signal on which a vibration detected in each of a plurality of locations on the cable is superimposed; and
an action specifying unit configured to specify, based on the optical signal, a location on the cable in which the vibration has been detected and specify an action of a target to be monitored which has caused the vibration,
in which the action specifying unit specifies a detection pattern that is used to specify the action of the target to be monitored depending on the environment of the location on the cable in which the vibration has been detected.

An action specifying method according to one aspect includes:
a reception step for receiving, from at least one optical fiber included in a cable, an optical signal on which a vibration detected in each of a plurality of locations on the cable is superimposed; and
an action specifying step for specifying, based on the optical signal, a location on the cable in which the vibration has been detected and specifying an action of a target to be monitored which has caused the vibration,
in which, in the action specifying step, a detection pattern that is used to specify the action of the target to be monitored is specified depending on the environment of the location on the cable in which the vibration has been detected.

A non-transitory computer readable medium according to one aspect stores a program for causing a computer to execute the following procedures:
a reception procedure for receiving, from at least one optical fiber included in a cable, an optical signal on which a vibration detected in each of a plurality of locations on the cable is superimposed; and
an action specifying procedure for specifying, based on the optical signal, a location on the cable in which the vibration has been detected and specifying an action of a target to be monitored which has caused the vibration,
in which, in the action specifying procedure, a detection pattern that is used to specify the action of the target to be monitored is specified depending on the environment of the location on the cable in which the vibration has been detected.

Advantageous Effects of Invention

According to the aforementioned aspects, it is possible to obtain an effect that an optical fiber sensing system, an action specifying apparatus, an action specifying method, and a computer readable medium capable of performing higher-level specification of the action of the target to be monitored in a more flexible way can be provided.

DESCRIPTION OF EMBODIMENTS

Hereinafter, with reference to the drawings, embodiments of the present disclosure will be explained.

First Embodiment

Configuration of First Embodiment

Figure 1:
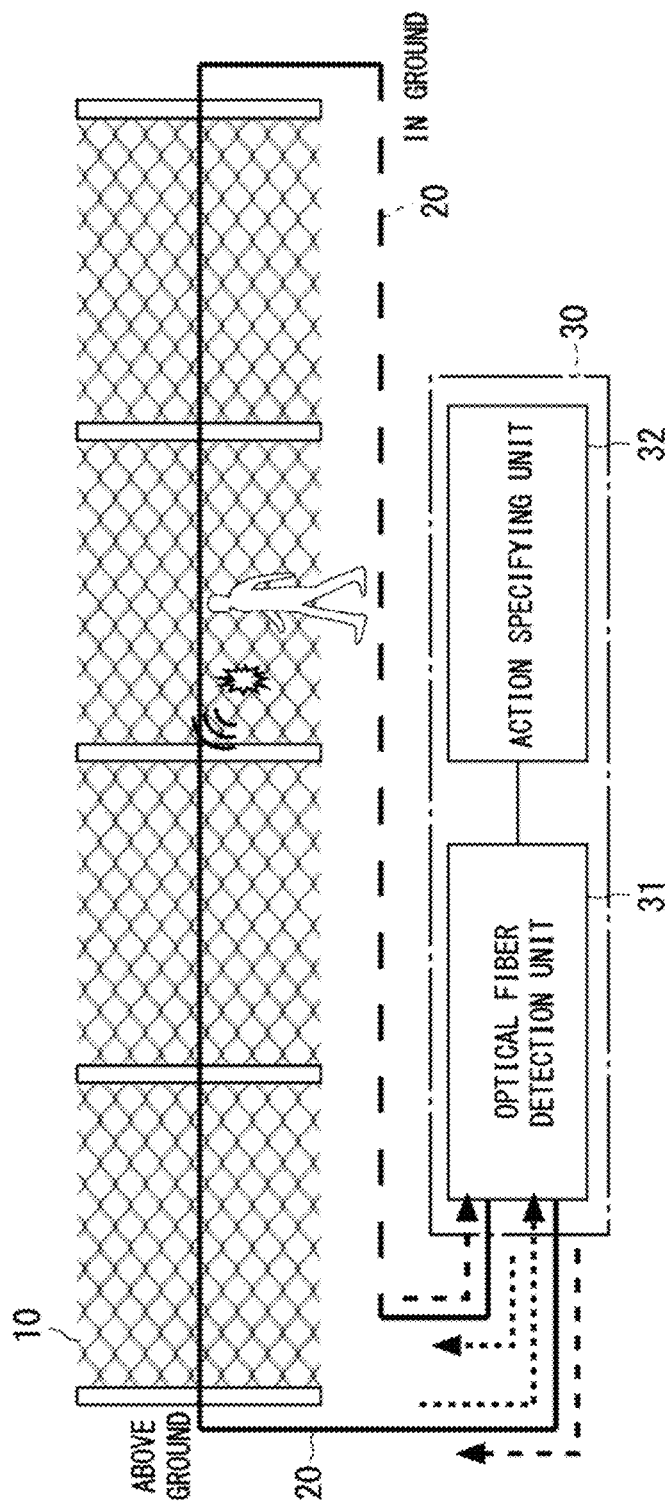
FIG. 1 is a diagram showing a configuration example of an optical fiber sensing system according to a first embodiment.

Referring first to FIG. 1, a configuration of an optical fiber sensing system according to a first embodiment will be explained. While the targets to be monitored are described as being persons who are in a fence 10 and in the vicinity thereof in the first embodiment, the target to be monitored is not limited thereto.

As shown in FIG. 1, the optical fiber sensing system according to the first embodiment, which detects actions of the targets to be monitored who are in the fence 10 and in the vicinity thereof, includes an optical fiber cable 20 and an action specifying apparatus 30. Further, the action specifying apparatus 30 includes an optical fiber detection unit 31 and an action specifying unit 32. Further, the optical fiber detection unit 31 is one example of a reception unit.

The optical fiber cable 20, which is a cable configured to coat one or more optical fibers, is laid continuously in the fence 10 above the ground, and in the ground in the vicinity of the fence 10, and the respective ends of the optical fiber cable 20 are connected to the optical fiber detection unit 31. In FIG. 1, the part of the optical fiber cable 20 laid above the ground is shown by a solid line and the part of the optical fiber cable 20 laid in the ground is shown by a dotted line. However, the method of laying the optical fiber cable 20 shown in FIG. 1 is merely one example, and it is not limited thereto.

The optical fiber detection unit 31 emits a pulsed light to at least one optical fiber included in the optical fiber cable 20. Further, the optical fiber detection unit 31 receives a reflected light or a scattered light generated while the pulsed light is being transmitted through the optical fiber as a return light via the same optical fiber. In FIG. 1, the optical fiber detection unit 31 emits the pulsed light in the clockwise direction and receives the return light with respect to this pulsed light from the clockwise direction. At the same time, the optical fiber detection unit 31 emits a pulsed light in the counterclockwise direction and receives a return light with respect to this pulsed light from the counterclockwise direction. That is, the optical fiber detection unit 31 receives the return light from two directions.

When a vibration occurs in the fence 10 and in the vicinity thereof, this vibration is superimposed on the return light transmitted by the optical fiber. Therefore, the optical fiber detection unit 31 is able to detect the vibration that has occurred in the fence 10 and in the vicinity thereof based on the received return light. Further, the optical fiber detection unit 31 is able to detect, based on the time from when the pulsed light is input to the optical fiber to when the return light on which the vibration is superimposed is received, the location on the optical fiber cable 20 where this vibration has occurred (the distance from the optical fiber detection unit 31).

Figure 2:
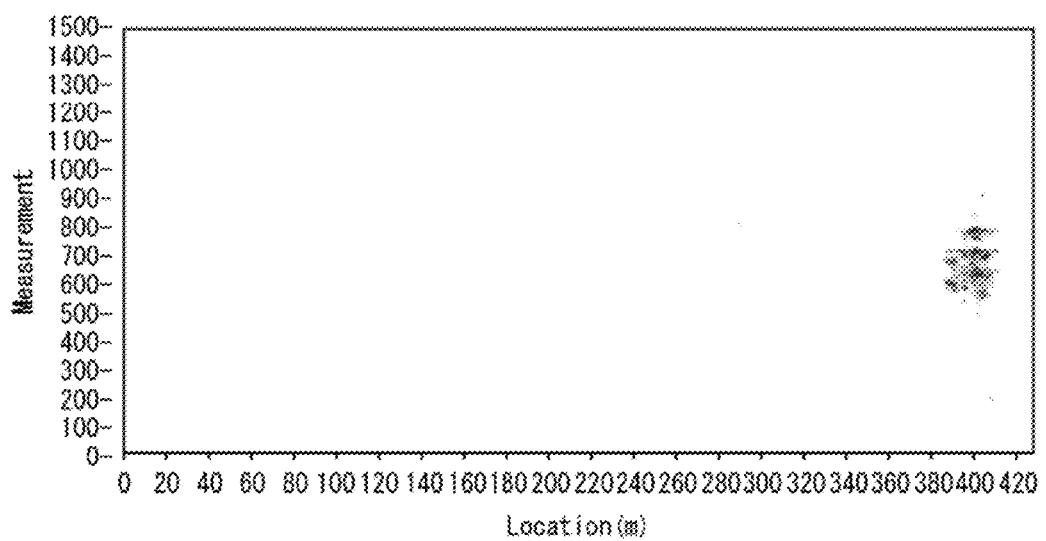
FIG. 2 is a diagram showing an example of vibration data acquired by an optical fiber detection unit according to the first embodiment.

For example, the optical fiber detection unit 31 detects the received return light by a distributed vibration sensor, whereby the optical fiber detection unit 31 is able to detect the vibration that has occurred in the fence 10 and in the vicinity thereof and the location on the optical fiber cable 20 where this vibration has occurred, and to acquire vibration data of the vibration that has occurred in the fence 10 and in the vicinity thereof. For example, FIG. 2 shows an example of the vibration data of the vibration that has occurred in the fence 10 and in the vicinity thereof, in which the horizontal axis indicates the location on the optical fiber cable 20 (distance from the optical fiber detection unit 31) and the vertical axis indicates the passage of time. In the example shown in FIG. 2, the vibration occurs in a position that is located about 400 m away from the optical fiber detection unit 31.

Now, the vibration data of the vibration that has occurred in the fence 10 and in the vicinity thereof detected by the optical fiber detection unit 31 has its unique pattern in which the transition of fluctuation in the strength of the vibration, the location of the vibration, the number of vibrations and the like differs from one another depending on the actions of the targets to be monitored who are in the fence 10 and in the vicinity thereof.

Therefore, the action specifying unit 32 is able to specify the actions taken by the targets to be monitored who are in the fence 10 and in the vicinity thereof by analyzing the dynamic change of the unique pattern that the vibration data has. The persons who are in the fence 10 and in the vicinity thereof may take, for example, the following actions.

(1) grab and shake the fence 10
(2) hit the fence 10
(3) climb the fence 10
(4) set up a ladder against the fence 10 and climb up the ladder
(5) hang around the fence 10
(6) dig a hole near the fence 10
(7) fire a gun near the fence 10
(8) put something near the fence 10

Figure 3:
FIG. 3 is a diagram showing an example in which the vibration data acquired by the optical fiber detection unit according to the first embodiment is arranged in time series.

For example, the vibration data indicating that the target to be monitored moves while hitting the fence 10 and eventually digs a hole in the vicinity of the fence 10 is as shown in FIG. 3. The vibration data shown in FIG. 3 is vibration data similar to the vibration data shown in FIG. 2 arranged vertically in time series.

Now, a method of specifying the actions of the targets to be monitored who are in the fence 10 and the vicinity thereof in the action specifying unit 32 based on the vibration data of the vibration that has occurred in the fence 10 and the vicinity thereof may be, for example, a method of using pattern matching. In the following description, one example of the pattern matching will be explained.

The action specifying unit 32 learns, in advance, a unique pattern that the vibration data of the vibration that is occurred when a person takes one of the aforementioned actions (1) to (8) in the fence 10 and the vicinity thereof has as an action model pattern by deep learning.

When the action specifying unit 32 specifies the actions of the targets to be monitored who are in the fence 10 and the vicinity thereof, it first acquires the vibration data from the optical fiber detection unit 31. Now, the vibration data acquired from the optical fiber detection unit 31 includes noise. Therefore, the action specifying unit 32 removes the noise pattern from the unique pattern that the vibration data acquired from the optical fiber detection unit 31 has.

Then, the action specifying unit 32 specifies the location on the optical fiber cable 20 in which the vibration has been detected based on the unique pattern after the noise pattern has been removed, and performs pattern matching between the unique pattern after the noise pattern has been removed and the action model pattern that has been learned in advance, thereby specifying the action of the target to be monitored which has caused the vibration.

However, it can be considered that the way in which the vibration or the like is transmitted is changed if the environment in which the optical fiber cable 20 is laid down is changed and the accuracy of specifying the action of the target to be monitored may be reduced.

In order to solve the aforementioned problem, in this first embodiment, the action specifying unit 32 specifies the detection pattern (the aforementioned action model pattern or noise pattern) that is used to specify the action of the target to be monitored which has caused the vibration depending on the environment of the location on the optical fiber cable 20 in which the vibration has been detected. The environment of the location on the optical fiber cable 20 in which the vibration has been detected may be, for example, in the ground/above the ground, the type of the structure in which the optical fiber cable 20 is laid down, the material of the structure in which the optical fiber cable 20 is laid down, the type of the ground in which the optical fiber cable 20 is laid down, weather, season, time zone, or surrounding situation (presence or absence of a construction site, presence or absence of an airport etc.) where the optical fiber cable 20 is laid down, it is not limited thereto. Further, the detection pattern that varies depending on the environment of the location on the optical fiber cable 20 in which the vibration has been detected may be one of the action model pattern and the noise pattern (the other one uses the same pattern regardless of the environment).

In the following description, an example in which the detection pattern is specified in the action specifying unit 32 depending on the environment of the location on the optical fiber cable 20 in which the vibration has been detected will be explained.

For example, the way in which the vibration that has occurred in the fence 10 and the vicinity thereof is transmitted in the part of the optical fiber cable 20 that is laid down above the ground is different from the way in which the above vibration is transmitted in the part that is laid down in the ground. Therefore, even when one action is detected in the part that is laid down above the ground and in the part that is laid down in the ground, it can be considered that the unique pattern detected in the part that is laid down above the ground and that detected in the part that is laid down in the ground are different from each other. Therefore, the action specifying unit 32 may specify the action model pattern depending on whether the location on the optical fiber cable 20 in which the vibration has been detected is above the ground or in the ground.

Further, it can be considered that the type of the noise in the part of the optical fiber cable 20 that is laid down above the ground is different from the type of the noise in the part of the optical fiber cable 20 that is laid down in the ground. It can be considered, for example, that the part that is laid down above the ground is strongly affected by weather (e.g., gust, rain, lightning strike, or snowfall) noise. On the other hand, it is considered that the part that is laid down in the ground is strongly affected by unwanted sound (e.g., unwanted sound during takeoff and landing of aircraft at airports or unwanted sound of traffic on roads) noise. Therefore, the action specifying unit 32 may specify the noise pattern depending on whether the location on the optical fiber cable 20 in which the vibration has been detected is above the ground or in the ground. The action specifying unit 32 may hold the noise pattern for each location on the optical fiber cable 20 in advance or may learn this noise pattern.

The action specifying unit 32 may learn, for example, the following patterns.

The pattern that is continuously detected when there is no target to be monitored may be learned or stored as the noise pattern.

A system may be operated for a predetermined period of time before it starts to be actually operated and a vibration that has been experimentally applied may be learned or stored as the action model pattern. Further, a pattern that is continuously detected when the experimental vibration is not applied may be learned or stored as the noise pattern.

The aforementioned patterns may be learned or stored for each environment separately acquired.

Further, it is considered that the unique pattern and the type of the noise vary depending on the type (e.g., structure or material) of the fence 10 as well. Therefore, the action specifying unit 32 may specify the action model pattern and the noise pattern depending on the type of the fence 10.

Further, while the optical fiber cable 20 is laid down in the fence 10, which is a structure, in this first embodiment, it can be considered that the unique pattern and the type of the noise in the case in which the optical fiber cable 20 is installed in the fence 10 and those in a case in which the optical fiber cable 20 is installed in another structure (e.g., a wall, a pipeline, a utility pole, a civil engineering structure, a road, or a railroad) are different from each other. Therefore, the action specifying unit 32 may specify the action model pattern and the noise pattern depending on the type of the structure in which the optical fiber cable 20 is installed in the location in which the vibration has been detected.

Further, it is considered that, even when the optical fiber cable 20 is always laid down in the ground, the unique pattern and the type of the noise vary depending on the type of the ground (e.g., material (soil or concrete) etc.). Therefore, the action specifying unit 32 may specify the action model pattern and the noise pattern depending on the type of the ground when the location on the optical fiber cable 20 in which the vibration has been detected is in the ground.

Further, it is considered that the unique pattern and the type of the noise vary also depending on the material of the optical fibers included in the optical fiber cable 20, the way in which the optical fiber cable 20 is laid down, etc. Therefore, the action specifying unit 32 may specify the action model pattern and the noise pattern depending on the material of the optical fibers included in the optical fiber cable 20 laid down in the location in which the vibration has been detected and the way in which the optical fiber cable 20 is laid down.

The action specifying unit 32 may hold, in advance, a table in which the environment of the location on the optical fiber cable 20 is associated with a detection pattern, and compare the environment of the location on the optical fiber cable 20 in which the vibration has been detected with this table, thereby specifying the detection pattern.

Alternatively, the action specifying unit 32 may hold, in advance, a table in which the location on the optical fiber cable 20 and a detection pattern are directly associated with each other, and compare the location on the optical fiber cable 20 in which the vibration has been detected with this table, thereby specifying the detection pattern.

In the following description, a method of specifying, in the action specifying unit 32, the environment of the location on the optical fiber cable 20 in which the vibration has been detected will be explained.

Figures 4, 5:
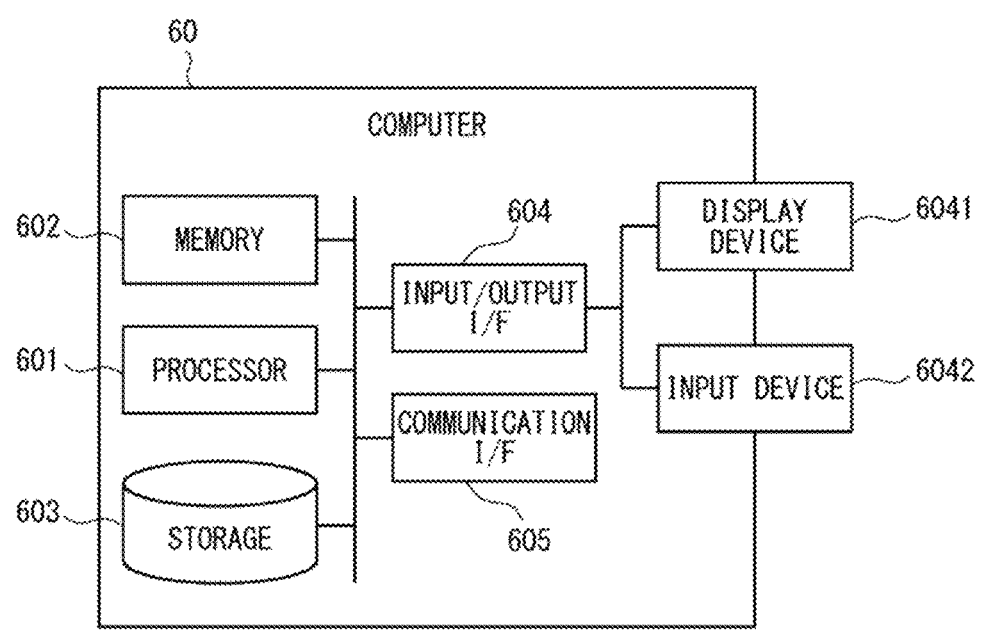
FIG. 4 is a diagram showing an example of a table held by an action specifying unit according to the first embodiment.
FIG. 5 is a block diagram showing an example of a hardware configuration of a computer that implements an action specifying apparatus according to the first embodiment.

The action specifying unit 32 holds, in advance, a table in which the location on the optical fiber cable 20 (e.g., a distance from the optical fiber detection unit 31) and the environment of this location are associated with each other. For example, an example of a table in a case in which the environment in which the optical fiber cable 20 is laid down above the ground is differentiated from the environment in which the optical fiber cable 20 is laid down in the ground is shown in FIG. 4.

The action specifying unit 32 first specifies the location on the optical fiber cable 20 in which the vibration has been detected. As described above, since the optical fiber detection unit 31 is able to detect the location on the optical fiber cable 20 in which the vibration has been detected, the action specifying unit 32 may specify the location in which the vibration has been detected based on the results of the detection in the optical fiber detection unit 31.

Upon specifying the location on the optical fiber cable 20 in which the vibration has been detected, the action specifying unit 32 compares the specified location in which the vibration has been detected with the aforementioned table, thereby specifying the environment of the location in which the vibration has been detected.

The action specifying unit 32 may remove noise using the detection pattern that corresponds to the specified environment after the environment of the location on the optical fiber cable 20 in which the vibration has been detected has been specified, specify the action of the target to be monitored using the detection pattern that corresponds to this environment, or may execute both of them.

In the following description, with reference to FIG. 5, a hardware configuration of a computer 60 implementing the action specifying apparatus 30 will be explained.

As shown in FIG. 5, the computer 60 includes a processor 601, a memory 602, a storage 603, an input/output interface (input/output I/F) 604, a communication interface (communication I/F) 605 and the like. The processor 601, the memory 602, the storage 603, the input/output interface 604, and the communication interface 605 are connected by a data transmission path for transmitting and receiving data between them.

The processor 601 is, for example, an operation processing apparatus such as a Central Processing Unit (CPU) or a Graphics Processing Unit (GPU). The memory 602 is, for example, a memory such as a Random Access Memory (RAM) or a Read Only Memory (ROM). The storage 603 is a storage device such as a Hard Disk Drive (HDD), a Solid State Drive (SSD), or a memory card. Further the storage 603 may be a memory such as a RAM or a ROM.

The storage 603 stores programs for achieving functions of the optical fiber detection unit 31 and the action specifying unit 32 included in the action specifying apparatus 30. The processor 601 executes these programs, thereby achieving the functions of the optical fiber detection unit 31 and the action specifying unit 32. When executing these programs, the processor 601 may load these programs on the memory 602 and then execute these loaded programs or may execute these programs without loading them on the memory 602. Further, the memory 602 and the storage 603 also serve to store information and data held in the optical fiber detection unit 31 and the action specifying unit 32.

Further, the program(s) can be stored and provided to a computer (including the computer 60) using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc-ROM (CD-ROM), CD-Recordable (CD-R), CD-Re-Writable (CD-R/W), and semiconductor memories (such as mask ROM, Programmable ROM (PROM), Erasable PROM (EPROM), flash ROM, RAM, etc.). Further, the program(s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The input/output interface 604 is connected to a display device 6041, an input device 6042 or the like. The display device 6041 is a device that displays a screen that corresponds to drawing data processed by the processor 601 such as a Liquid Crystal Display (LCD) or a Cathode Ray Tube (CRT) display. The input device 6042, which is a device that receives an operation input by an operator, is, for example, a keyboard, a mouse, and a touch sensor. The display device 6041 and the input device 6042 may be integrated and may be provided as a touch panel. The computer 60, which may include a sensor (not shown) such as a distributed vibration sensor, may include a configuration in which this sensor is connected to the input/output interface 604.

The communication interface 605 transmits and receives data to and from an external apparatus. The communication interface 605 communicates, for example, with an external apparatus via a wired communication path or a wireless communication path.

Operations of First Embodiment

Hereinafter, with reference to FIG. 6, an operation flow of the optical fiber sensing system according to this first embodiment will be explained.

Figure 6:
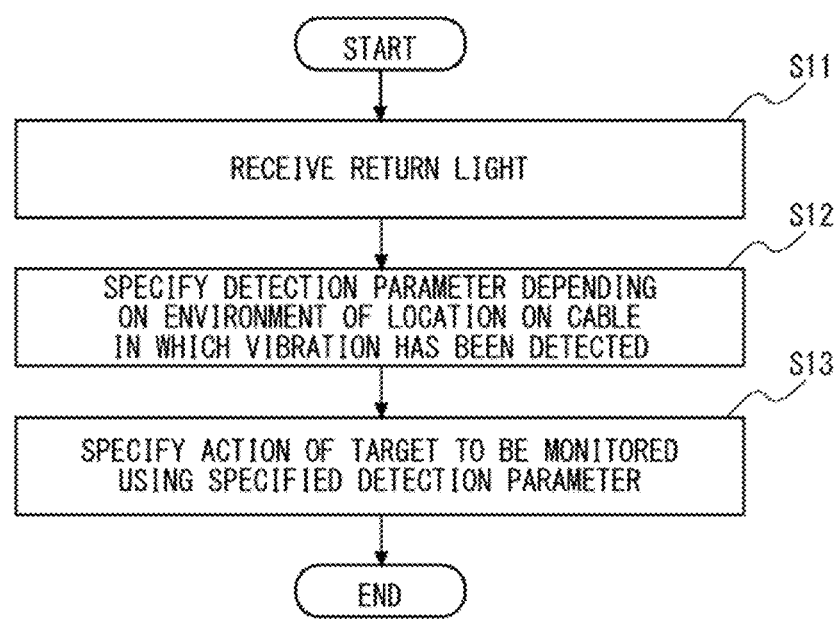
FIG. 6 is a flowchart showing an example of an operation flow of an optical fiber sensing system according to the first embodiment.

As shown in FIG. 6, first, the optical fiber detection unit 31 emits the pulsed light to at least one optical fiber included in the optical fiber cable 20 and receives the return light from the optical fiber the same as the optical fiber to which the pulsed light has been emitted (Step S11). The vibration detected in each of the plurality of positions on the optical fiber cable 20 is superimposed on this return light.

Next, the action specifying unit 32 specifies, based on the return light, the location on the optical fiber cable 20 in which the vibration has been detected, and specifies the detection pattern (the action model pattern or the noise pattern) depending on the environment of the specified location in which the vibration has been detected (Step S12). In this case, when the detection pattern that has been used before and the specified detection pattern are different from each other, the action specifying unit 32 performs switching of the detection pattern.

After that, the action specifying unit 32 specifies the action of the target to be monitored which has caused the vibration on the optical fiber cable 20 using the specified detection pattern (Step S13).

Effects of First Embodiment

As described above, according to this first embodiment, the action specifying apparatus 30 specifies, based on the return light (optical signal) received from at least one optical fiber included in the optical fiber cable 20, the location on the optical fiber cable 20 in which the vibration has been detected, and specifies the action of the target to be monitored which has caused the vibration. In this case, the action specifying apparatus 30 specifies detection parameters that are used to specify the action of the target to be monitored depending on the environment of the location on the optical fiber cable 20 in which the vibration has been detected. As described above, appropriate detection parameters are specified depending on the environment of the location on the optical fiber cable 20 in which the vibration has been detected, and the action of the target to be monitored is specified using the specified detection parameters, whereby it is possible to specify the action of the target to be monitored at a higher level and in a more flexible way.

Further, according to this first embodiment, the action specifying apparatus 30 performs matching between the unique pattern that the vibration data of the vibration superimposed on the return light has and the action model pattern to specify the action of the target to be monitored. That is, instead of specifying the state based on a rough reference such as whether the magnitude of a vibration is large or small, as disclosed in Cited Literature 1, for example, (e.g., the state is specified from results that the vibration is large and the number of vibrations is large), the action specifying apparatus 30 dynamically analyzes the pattern of the change of the unique pattern that vibration data has (e.g., transition of a change in the magnitude of the vibration), thereby specifying the state of the target to be monitored. It is therefore possible to specify the action of the target to be monitored with a high accuracy.

Further, according to the first embodiment, the optical fiber sensing technology that uses the optical fibers as sensors is used. Therefore, it is possible to obtain advantages that there is no influence of electromagnetic noise, power feeding to the sensors becomes unnecessary, environmental tolerance is high, and a maintenance operation can be easily performed.

Second Embodiment

Figure 7:
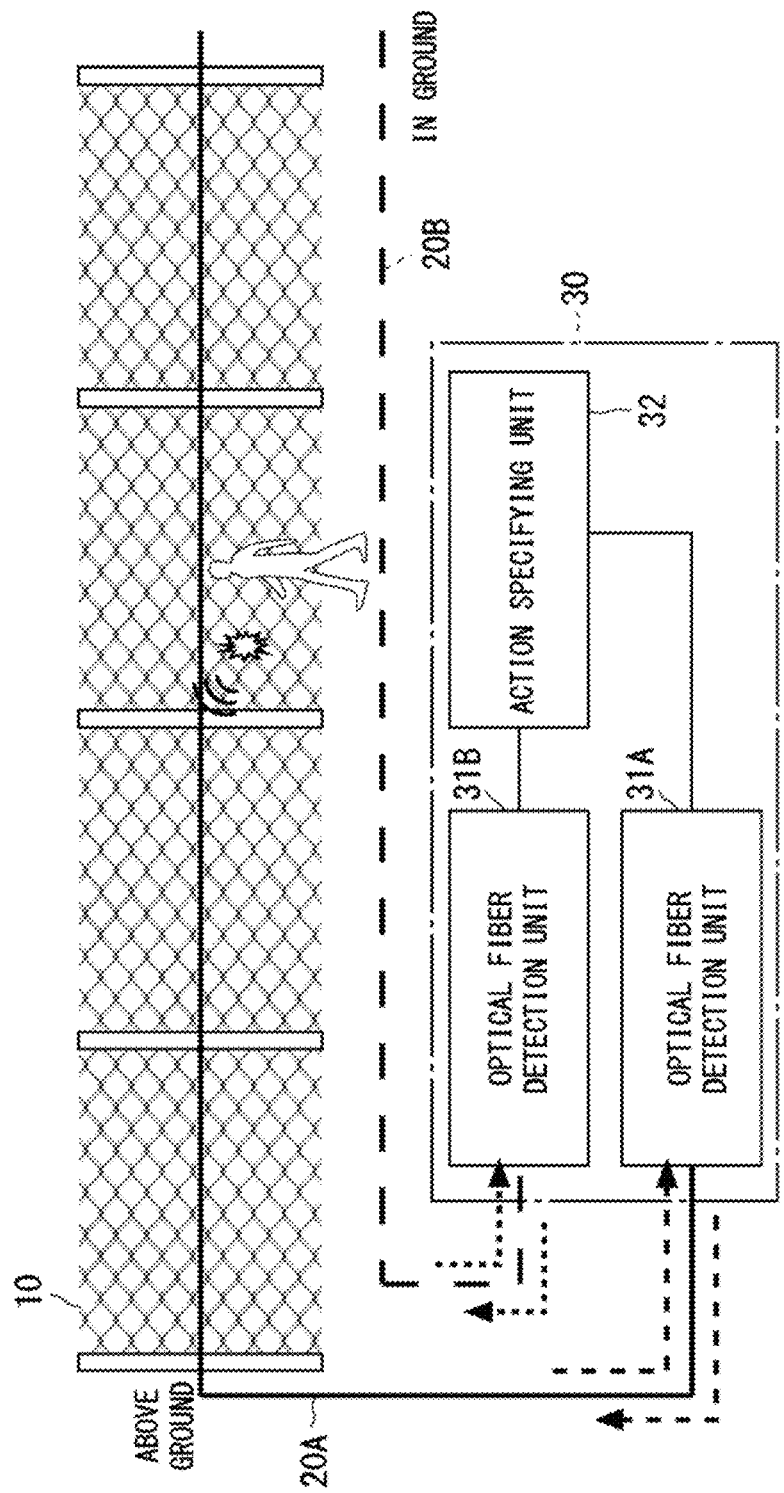
FIG. 7 is a diagram showing a configuration example of an optical fiber sensing system according to a second embodiment.

Referring next to FIG. 7, a configuration of an optical fiber sensing system according to a second embodiment will be explained. While the description will be made assuming that the targets to be monitored are persons who are in the fence 10 and in the vicinity thereof in this second embodiment as well, similar to the aforementioned first embodiment, the target to be monitored is not limited to them. Further, while the environment in which the optical fiber cable 20 is laid down above the ground is differentiated from the environment in which the optical fiber cable 20 is laid down in the ground in this second embodiment, the differentiation in the environments is not limited thereto.

As shown in FIG. 7, the optical fiber sensing system according to this second embodiment is different from that in the aforementioned first embodiment in that the optical fiber sensing system according to this second embodiment includes an optical fiber cable 20A laid down above the ground and an optical fiber cable 20B laid down in the ground (in the following description, the optical fiber cables 20A and 20B are referred to as an optical fiber cable 20 unless they need to be differentiated from each other) and two optical fiber detection units 31A and 31B that are provided in such a way that they respectively correspond to the two optical fiber cables 20A and 20B (in the following description, the optical fiber detection units 31A and 31B are referred to as an optical fiber detection unit 31 unless they need to be differentiated from each other).

The optical fiber detection unit 31A is provided in such a way that it corresponds to the optical fiber cable 20A laid down above the ground. The optical fiber detection unit 31A emits a pulsed light to at least one optical fiber included in the optical fiber cable 20A and receives a reflected light or a scattered light generated while the pulsed light is being transmitted through the optical fiber as a return light via the same optical fiber.

The optical fiber detection unit 31B is provided in such a way that it corresponds to the optical fiber cable 20B laid in the ground. The optical fiber detection unit 31B emits a pulsed light to at least one optical fiber included in the optical fiber cable 20B, and receives a reflected light or a scattered light generated while the pulsed light is being transmitted through the optical fiber as a return light via the same optical fiber.

In the aforementioned first embodiment, the optical fiber cable 20 is laid continuously above the ground and in the ground. Therefore, in order to specify, in the action specifying unit 32, the environment of the location on the optical fiber cable 20 in which the vibration has been detected (whether the optical fiber cable 20 is laid down above the ground or in the ground), it is required to specify the location on the optical fiber cable 20 in which the vibration has been detected.

On the other hand, in this second embodiment, two different optical fiber cables 20A and 20B are laid down depending on whether they are laid down above the ground or in the ground, and the optical fiber detection units 31A and 31B are provided in such a way that they respectively correspond to the two optical fiber cables 20A and 20B.

Therefore, in order to specify, in the action specifying unit 32, the environment of the location in which the vibration has been detected, it is sufficient to determine by which one of the optical fiber detection units 31A and 31B the return light on which this vibration is superimposed has been received, and it is not required to specify the location on the optical fiber cable 20 in which the vibration has been detected. In this second embodiment as well, it is required to store the optical fiber detection unit 31 and the detection pattern (or the environment in which the optical fiber cable 20 that corresponds to the optical fiber detection unit 31 is laid down) in association with each other.

While the environment in which the optical fiber cable 20 is laid down above the ground is differentiated from the environment in which the optical fiber cable 20 is laid down in the ground in the aforementioned description, the differentiation in the environments is not limited thereto, as described above.

In this second embodiment, the plurality of optical fiber cables 20 may be laid down for each of the distinct environments different from one another, and the plurality of respective optical fiber detection units 31 may be provided so that they correspond to the plurality of respective optical fiber cables 20. When, for example, the environment in which the optical fiber cable 20 is laid down is differentiated depending on the material of the optical fibers, the plurality of optical fiber cables 20 whose materials are different from one another may be laid down, and the plurality of optical fiber detection units 31 may be provided so that they correspond to the plurality of respective optical fiber cables 20.

As described above, according to this second embodiment, for each of the environments different from one another, the plurality of optical fiber cables 20 are laid down and the plurality of optical fiber detection units 31 are provided in such a way that they correspond to the plurality of respective optical fiber cables 20. Therefore, in order to specify the environment of the location on the optical fiber cable 20 in which the vibration has been detected, it is sufficient that the action specifying apparatus 30 determine by which optical fiber detection unit 31 the return light on which this vibration is superimposed has been received, whereby the action specifying apparatus 30 is able to easily specify the environment of the location in which the vibration has been detected.

Third Embodiment

Figure 8:
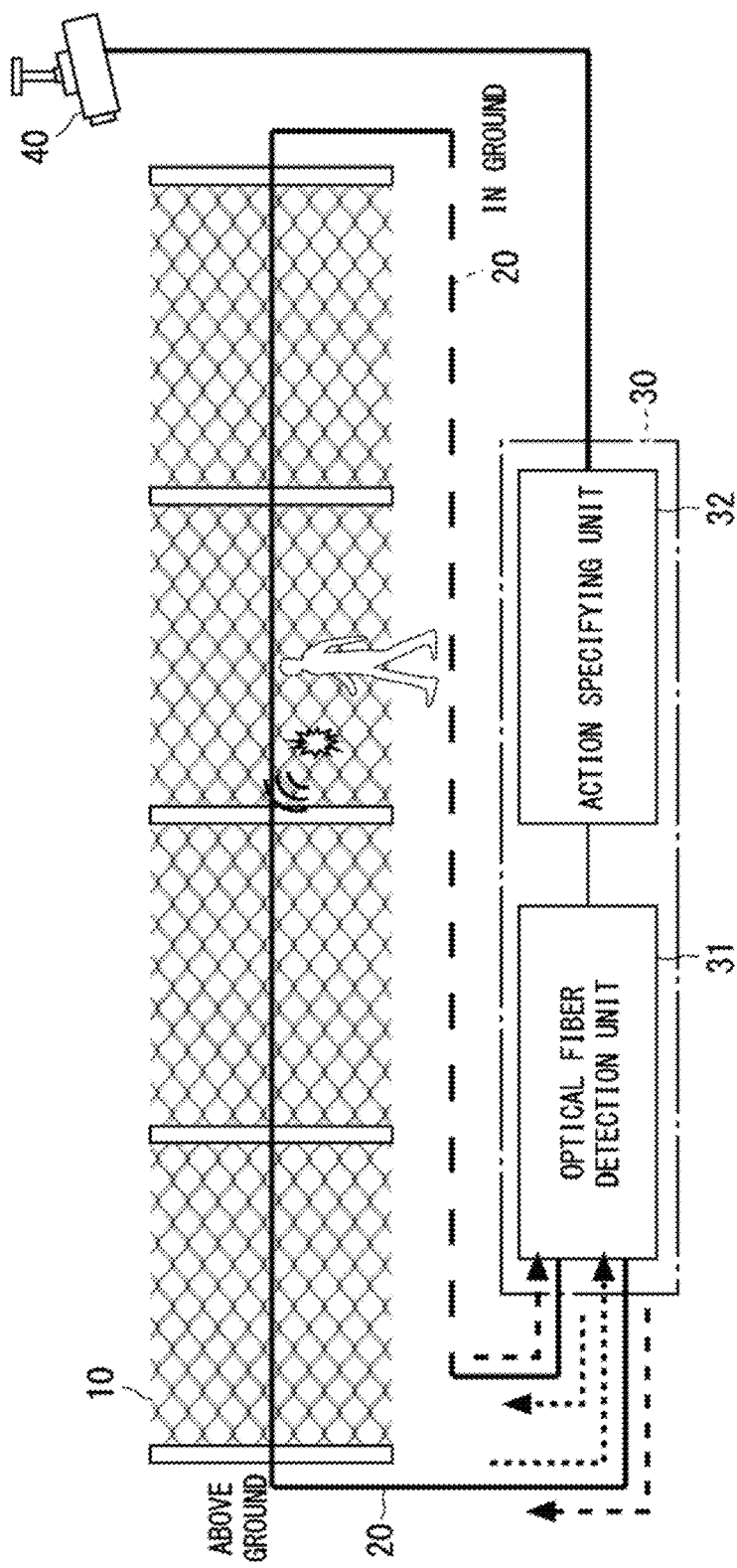
FIG. 8 is a diagram showing a configuration example of an optical fiber sensing system according to a third embodiment.

Referring next to FIG. 8, a configuration of an optical fiber sensing system according to a third embodiment will be explained. In this third embodiment as well, similar to the aforementioned first and second embodiments, the description will be made assuming that the targets to be monitored are persons who are in the fence 10 and in the vicinity thereof. However, the target to be monitored is not limited thereto. Further, while an example which is based on the aforementioned first embodiment will be explained in this third embodiment, this third embodiment may also be applied to an example which is based on the aforementioned second embodiment.

As shown in FIG. 8, the optical fiber sensing system according to the third embodiment further includes a camera 40 in addition to the components of the aforementioned first embodiment. While only one camera 40 is provided in FIG. 8, a plurality of cameras 40 may be provided.

The camera 40, which captures images of the fence 10 and the vicinity thereof, is achieved by, for example, a fixed camera, a Pan Tilt Zoom (PTZ) camera or the like.

The action specifying unit 32 holds camera information indicating the location in which the camera 40 is installed (distance from the optical fiber detection unit 31), the area whose image can be captured by the camera 40 and the like. Further, as described above, the action specifying unit 32 is able to specify the location on the optical fiber cable 20 in which the vibration has been detected and the action of the target to be monitored which has caused the vibration using the detection pattern. Therefore, the action specifying unit 32 may control the camera 40 based on the action of the target to be monitored which has caused the vibration on the optical fiber cable 20 specified using the detection pattern. The action specifying unit 32 may control, for example, the angle (azimuth angle, elevation angle) of the camera 40, point the camera 40 at the target to be monitored, and further control zoom magnification and the like.

Further, the action specifying unit 32 may perform image recognition of the camera image captured by the camera 40, specify the action of the target to be monitored, and perform face authentication of the target to be monitored on a camera image.

Further, the action specifying unit 32 may determine consistency between the action of the target to be monitored that has been specified using the aforementioned detection pattern and the action of the target to be monitored that has been specified using the camera image.

Further, the action specifying unit 32 may change the control of the camera 40 depending on the specified action taken by the target to be monitored. For example, when a suspicious action that is required to be dealt with more immediately (e.g., digging a hole in the vicinity of the fence 10, climbing the fence 10 etc.) has been specified, the action specifying unit 32 may zoom in the camera 40 so as to specify the face and the person in more detail. Further, when the suspicious action that is required to be dealt with more immediately has been specified, if the target to be monitored can be captured by a plurality of cameras 40, the action specifying unit 32 may track the target to be monitored by the plurality of cameras 40. Further, the action specifying unit 32 may cause, when the target to be monitored is tracked by the plurality of cameras 40, at least one of the plurality of cameras 40 to capture an image of the face of the target to be monitored, to thereby utilizing the captured face image for face authentication, and may cause at least one of the plurality of cameras 40 to capture an image of the whole area including the target to be monitored, to thereby utilizing the captured image for monitoring of the action of the target to be monitored.

Further, when the action specifying unit 32 has detected that the location on the optical fiber cable 20 in which the vibration has been detected that has been specified using the aforementioned detection pattern, that is, the location of the target to be monitored, has approached an area whose image can be captured by the camera 40, the action specifying unit 32 may perform control such as pointing the camera in the direction in which there is a target to be monitored and further zooming in the camera.

Further, when a plurality of persons are present inside the area whose image can be captured by the camera 40, the action specifying unit 32 may capture an image of only a specific person instead of capturing an image of all these people. The action specifying unit 32 may specify, for example, the actions of the plurality of respective persons using the aforementioned detection pattern, and determine the target to be captured from among the plurality of persons based on the actions of the plurality of respective persons. In this case, for example, the action specifying unit 32 may determine the person who is acting suspiciously to be the target to be captured. In this case, in the following process, the action specifying unit 32 may capture, by the camera 40, an image of only the person who is the target to be captured.

As described above, according to the third embodiment, the action specifying apparatus 30 points the camera 40 at the target to be monitored based on the action of the target to be monitored which has caused the vibration on the optical fiber cable 20 specified using the aforementioned detection pattern or determine consistency between the action of the target to be monitored that has been specified using the aforementioned detection pattern and the action of the target to be monitored that has been specified using the camera image. In this way, by linking the optical fibers and the camera 40, the action of the target to be monitored may be specified with a higher accuracy.

While the present disclosure has been described with reference to the embodiments, the present disclosure is not limited to the aforementioned embodiments. Various changes that can be understood by those skilled in the art can be made to the configurations and the details of the present disclosure within the scope of the present disclosure.

For example, while the action specifying unit 32 specifies the action of the target to be monitored using the unique pattern that the vibration data of the vibration detected in one environment (e.g., above the ground or in the ground) on the optical fiber cable 20 has in the aforementioned embodiments, it is not limited thereto. The action specifying unit 32 may specify the action of the target to be monitored using the unique pattern that the vibration data of the vibration detected in each of the plurality of environments on the optical fiber cable 20 different from each other (e.g., both above the ground and in the ground) has.

For example, the action specifying unit 32 may specify that the target to be monitored is cutting the fence 10 using the unique pattern that the vibration data of the vibration that has occurred at a certain point on the fence 10 above the ground has, specify that the target to be monitored is standing on the ground using the unique pattern that the vibration data of the vibration that has occurred in the ground in the vicinity of the above point has, and specify a composite action of the target to be monitored such as standing on the ground and cutting the fence 10 by integrating the above results. Further, the action specifying unit 32 may specify that the target to be monitored is cutting the fence 10 using the unique pattern that the vibration data of the vibration that has occurred at a certain point on the fence 10 above the ground has, specify that the target to be monitored is hanging around the fence 10 using the unique pattern that the vibration data of the vibration that has occurred in the ground in the vicinity of the above point has, and specify both the action that the target to be monitored is cutting the fence 10 and the action that the target to be monitored is hanging around the fence 10 by integrating the above results.

Further, even in a case in which one action is specified, not a composite action of the target to be monitored, it is possible that the accuracy of specifying the action may be still low if the unique pattern that the vibration data of the vibration that has occurred in one environment has is simply used. In this case, it becomes possible to improve the accuracy of specifying the action of the target to be monitored using the unique pattern that the vibration data of the vibration that has occurred in each of the plurality of environments has.

Further, the action specifying unit 32 may specify the action of the target to be monitored using the unique pattern that the vibration data of the vibration that has occurred in the fence 10 above the ground has and specify the location of the target to be monitored using the unique pattern that the vibration data of the vibration that has occurred in the ground in the vicinity of the fence 10 has.

Further, while the example in which the location of the target to be monitored is specified has been described using the unique pattern that the vibration data of the vibration that has occurred in the fence 10 and the vicinity thereof has has been described in the aforementioned embodiments, it is not limited thereto.

Besides a vibration that has occurred in the fence 10 and the vicinity thereof, a sound and the temperature generated in the fence 10 and in the vicinity thereof are also superimposed on the return light transmitted by the optical fiber. Therefore, the optical fiber detection unit 31 is able to detect the sound and the temperature generated in the fence 10 and in the vicinity thereof as well based on the received return light.

The optical fiber detection unit 31 detects, for example, the received return light by a distributed acoustic sensor and a distributed temperature sensor, whereby the optical fiber detection unit 31 is able to detect the sound and the temperature occurred in the fence 10 and in the vicinity thereof and acquire acoustic data and temperature data of the sound and the temperature occurred in the fence 10 and in the vicinity thereof. In addition thereto, the optical fiber detection unit 31 is able to detect distortion/stress occurred in the fence 10 and in the vicinity thereof and acquire distortion/stress data. Further, the acoustic data, the temperature data, and the distortion/stress data described above also have a unique pattern in accordance with the actions of the targets to be monitored who are in the fence 10 and the vicinity thereof.

Therefore, the action specifying unit 32 may specify the action of the target to be monitored by analyzing not only the unique pattern of the vibration that has occurred in the fence 10 and the vicinity thereof but also a dynamic change in a composite unique pattern including a unique pattern of a sound, temperature, distortion/stress or the like. It is therefore possible to specify the action of the target to be monitored with a higher accuracy and to specify a more complex action of the target to be monitored.

Further, while the example in which the combination of a part above the ground and a part in the ground in which the optical fiber cable 20 is laid down is the fence 10 and the ground in the vicinity of the fence 10 has been described in the aforementioned embodiments, the combination of the part above the ground and the part in the ground is not limited thereto. The combination of the part above the ground and the part in the ground may be another combination such as a combination of a wall and a floor.

For example, while the example in which the targets to be monitored are persons who are in the fence 10 and a place in the vicinity of the fence 10 has been described in the aforementioned embodiments, the target to be monitored is not limited thereto. The target to be monitored may be a person who is on a wall, a floor, a pipeline, a utility pole, a civil engineering structure, a road, a railroad, and a place in the vicinity thereof, not a person who is in the fence 10. Further, the fence, the wall and the like may be installed in a commercial facility, an airport, a border, a hospital, a city, a port, a plant, a nursing care facility, an office building, a nursery center, or at home. Further, the target to be monitored may be an animal, an automobile or the like, not a person.

A part or all of the aforementioned embodiments may be described as shown in the following Supplementary Notes. However, they are not limited thereto.

(Supplementary Note 1)

An optical fiber sensing system comprising:
a cable including optical fibers;
a reception unit configured to receive, from at least one optical fiber included in the cable, an optical signal on which a vibration detected in each of a plurality of locations on the cable is superimposed; and
an action specifying unit configured to specify, based on the optical signal, a location on the cable in which the vibration has been detected and specify an action of a target to be monitored which has caused the vibration,
wherein the action specifying unit specifies a detection pattern that is used to specify the action of the target to be monitored depending on the environment of the location on the cable in which the vibration has been detected.

(Supplementary Note 2)

The optical fiber sensing system according to Supplementary Note 1, wherein the action specifying unit specifies the detection pattern depending on whether the location on the cable in which the vibration has been detected is above the ground or in the ground.

(Supplementary Note 3)

The optical fiber sensing system according to Supplementary Note 1 or 2, wherein
- the vibration has a unique pattern in accordance with the action of the target to be monitored,
- the action specifying unit removes a noise pattern from a unique pattern that the vibration has, and performs matching between a unique pattern after the noise pattern has been removed and an action model pattern, thereby specifying the action of the target to be monitored, and
- the action specifying unit specifies the action model pattern as the detection pattern depending on the environment of the location on the cable in which the vibration has been detected.

(Supplementary Note 4)

The optical fiber sensing system according to Supplementary Note 1 or 2, wherein
- the vibration has a unique pattern in accordance with the action of the target to be monitored,
- the action specifying unit removes a noise pattern from a unique pattern that the vibration has, and performs matching between a unique pattern after the noise pattern has been removed and an action model pattern, thereby specifying the action of the target to be monitored, and
- the action specifying unit specifies the noise pattern as the detection pattern depending on the environment of the location on the cable in which the vibration has been detected.

(Supplementary Note 5)

The optical fiber sensing system according to any one of Supplementary Notes 1 to 4, wherein
- the action specifying unit holds a table in which a location on the cable and the environment of this location are associated with each other, and
- the action specifying unit compares the location on the cable in which the vibration has been detected with the table, thereby specifying the environment of the location in which the vibration has been detected.

(Supplementary Note 6)

The optical fiber sensing system according to any one of Supplementary Notes 1 to 4, wherein
- the cable includes a plurality of cables laid down in a plurality of environments different from one another,
- the reception unit includes a plurality of reception units that are provided in such a way that the plurality of reception units correspond to the plurality of respective cables and each reception unit receives the optical signal from a corresponding one of the respective cables, and
- the action specifying unit specifies the environment of the location in which the vibration has been detected depending on by which one of the reception units the optical signal on which the vibration is superimposed has been received.

(Supplementary Note 7)

The optical fiber sensing system according to any one of Supplementary Notes 1, 2, 5, and 6, wherein
- the vibration has a unique pattern in accordance with the action of the target to be monitored, and
- the action specifying unit specifies the action of the target to be monitored using a unique pattern in accordance with the action of the target to be monitored that the vibration detected by each of a plurality of locations on the cable whose environments are different from one another has.

(Supplementary Note 8)

The optical fiber sensing system according to any one of Supplementary Notes 1 to 7, further comprising a camera capable of capturing an image of the target to be monitored, wherein
- the action specifying unit specifies the action of the target to be monitored using a camera image captured by the camera, and
- the action specifying unit determines consistency between the action of the target to be monitored that has been specified using the detection pattern and the action of the target to be monitored that has been specified by the camera image.

(Supplementary Note 9)

The optical fiber sensing system according to any one of Supplementary Notes 1 to 7, further comprising a camera capable of capturing an image of the target to be monitored,
wherein the action specifying unit points the camera at the target to be monitored based on the action of the target to be monitored that has been specified using the detection pattern.

(Supplementary Note 10)

An action specifying apparatus comprising:
- a reception unit configured to receive, from at least one optical fiber included in a cable, an optical signal on which a vibration detected in each of a plurality of locations on the cable is superimposed; and
- an action specifying unit configured to specify, based on the optical signal, a location on the cable in which the vibration has been detected and specify an action of a target to be monitored which has caused the vibration,
wherein the action specifying unit specifies a detection pattern that is used to specify the action of the target to be monitored depending on the environment of the location on the cable in which the vibration has been detected.

(Supplementary Note 11)

The action specifying apparatus according to Supplementary Note 10, wherein the action specifying unit specifies the detection pattern depending on whether the location on the cable in which the vibration has been detected is above the ground or in the ground.

(Supplementary Note 12)

The action specifying apparatus according to Supplementary Note 10 or 11, wherein
- the vibration has a unique pattern in accordance with the action of the target to be monitored,
- the action specifying unit removes a noise pattern from a unique pattern that the vibration has, and performs matching between a unique pattern after the noise pattern has been removed and an action model pattern, thereby specifying the action of the target to be monitored, and the action specifying unit specifies the action model pattern as the detection pattern depending on the environment of the location on the cable in which the vibration has been detected.

(Supplementary Note 13)

The action specifying apparatus according to Supplementary Note 10 or 11, wherein
the vibration has a unique pattern in accordance with the action of the target to be monitored,
the action specifying unit removes a noise pattern from a unique pattern that the vibration has, and performs matching between a unique pattern after the noise pattern has been removed and an action model pattern, thereby specifying the action of the target to be monitored, and
the action specifying unit specifies the noise pattern as the detection pattern depending on the environment of the location on the cable in which the vibration has been detected.

(Supplementary Note 14)

The action specifying apparatus according to any one of Supplementary Notes 10 to 13, wherein
the action specifying unit holds a table in which a location on the cable and the environment of this location are associated with each other, and
the action specifying unit compares the location on the cable in which the vibration has been detected with the table, thereby specifying the environment of the location in which the vibration has been detected.

(Supplementary Note 15)

The action specifying apparatus according to any one of Supplementary Notes 10 to 13, wherein
the cable includes a plurality of cables laid down in a plurality of environments different from one another,
the action specifying apparatus includes a plurality of reception units that are provided in such a way that the plurality of reception units correspond to the plurality of respective cables and each reception unit receives the optical signal from a corresponding one of the respective cables, and
the action specifying unit specifies the environment of the location in which the vibration has been detected depending on by which one of the reception units the optical signal on which the vibration is superimposed has been received.

(Supplementary Note 16)

The action specifying apparatus according to any one of Supplementary Notes 10, 11, 14, and 15, wherein
the vibration has a unique pattern in accordance with the action of the target to be monitored, and
the action specifying unit specifies the action of the target to be monitored using a unique pattern in accordance with the action of the target to be monitored that the vibration detected by each of a plurality of locations on the cable whose environments are different from one another has.

(Supplementary Note 17)

The action specifying apparatus according to any one of Supplementary Notes 10 to 16, wherein
the action specifying unit specifies the action of the target to be monitored using a camera image captured by a camera capable of capturing an image of the target to be monitored, and
the action specifying unit determines consistency between the action of the target to be monitored that has been specified using the detection pattern and the action of the target to be monitored that has been specified by the camera image.

(Supplementary Note 18)

The action specifying apparatus according to any one of Supplementary Notes 10 to 16, wherein the action specifying unit points a camera capable of capturing an image of the target to be monitored at the target to be monitored based on the action of the target to be monitored that has been specified using the detection pattern.

(Supplementary Note 19)

An action specifying method by an action specifying apparatus, the action specifying method comprising:
a reception step for receiving, from at least one optical fiber included in a cable, an optical signal on which a vibration detected in each of a plurality of locations on the cable is superimposed; and
an action specifying step for specifying, based on the optical signal, a location on the cable in which the vibration has been detected and specifying an action of a target to be monitored which has caused the vibration,
wherein, in the action specifying step, a detection pattern that is used to specify the action of the target to be monitored is specified depending on the environment of the location on the cable in which the vibration has been detected.

(Supplementary Note 20)

A non-transitory computer readable medium storing a program causing a computer to execute the following procedures:
a reception procedure for receiving, from at least one optical fiber included in a cable, an optical signal on which a vibration detected in each of a plurality of locations on the cable is superimposed; and
an action specifying procedure for specifying, based on the optical signal, a location on the cable in which the vibration has been detected and specifying an action of a target to be monitored which has caused the vibration,
wherein, in the action specifying procedure, a detection pattern that is used to specify the action of the target to be monitored is specified depending on the environment of the location on the cable in which the vibration has been detected.

REFERENCE SIGNS LIST

10 Fence
20 Optical Fiber Cable
30 Action Specifying Apparatus
31 Optical Fiber Detection Unit
32 Action Specifying Unit
40 Camera
60 Computer
601 Processor
602 Memory
603 Storage
604 Input/output Interface
6041 Display Device
6042 Input Device
605 Communication Interface

What is claimed is:

1. An optical fiber sensing system comprising:
a cable including optical fibers;
a reception unit configured to receive, from at least one optical fiber included in the cable, an optical signal on which a vibration detected on the cable is superimposed; and an action specifying unit configured to specify, based on the optical signal, a location on the cable in which the vibration has been detected and specify an action of a target to be monitored which has caused the vibration, wherein the action specifying unit is configured to specify a detection pattern that is used to specify the action of the target to be monitored depending on the environment of the location on the cable in which the vibration has been detected, wherein the cable includes a plurality of cables laid down in a plurality of environments different from one another, wherein the reception unit includes a plurality of reception units that are provided in such a way that the plurality of reception units correspond to the plurality of respective cables and each reception unit is configured to receive the optical signal from a corresponding one of the respective cables, and wherein the action specifying unit is configured to specify the environment of the location in which the vibration has been detected depending on by which one of the reception units the optical signal on which the vibration is superimposed has been received.

2. The optical fiber sensing system according to claim 1, wherein the action specifying unit is configured to specify the detection pattern depending on whether the location on the cable in which the vibration has been detected is above the ground or in the ground.

3. The optical fiber sensing system according to claim 1, wherein the vibration has a unique pattern in accordance with the action of the target to be monitored, wherein the action specifying unit is configured to remove a noise pattern from a unique pattern that the vibration has, and performs matching between a unique pattern after the noise pattern has been removed and an action model pattern, thereby specifying the action of the target to be monitored, and wherein the action specifying unit is configured to specify the action model pattern as the detection pattern depending on the environment of the location on the cable in which the vibration has been detected.

4. The optical fiber sensing system according to claim 1, wherein the vibration has a unique pattern in accordance with the action of the target to be monitored, wherein the action specifying unit is configured to remove a noise pattern from a unique pattern that the vibration has, and performs matching between a unique pattern after the noise pattern has been removed and an action model pattern, thereby specifying the action of the target to be monitored, and wherein the action specifying unit is configured to specify the noise pattern as the detection pattern depending on the environment of the location on the cable in which the vibration has been detected.

5. The optical fiber sensing system according to claim 1, wherein the action specifying unit is configured to hold a table in which a location on the cable and the environment of this location are associated with each other, and wherein the action specifying unit is configured to compare the location on the cable in which the vibration has been detected with the table, thereby specifying the environment of the location in which the vibration has been detected.

6. The optical fiber sensing system according to claim 1, wherein the vibration has a unique pattern in accordance with the action of the target to be monitored, and wherein the action specifying unit is configured to specify the action of the target to be monitored using a unique pattern in accordance with the action of the target to be monitored, the unique pattern is included in the vibration detected at each of a plurality of locations on the cable.

7. The optical fiber sensing system according to claim 1, further comprising a camera capable of capturing an image of the target to be monitored, wherein the action specifying unit is configured to specify the action of the target to be monitored using a camera image captured by the camera, and wherein the action specifying unit is configured to determine consistency between the action of the target to be monitored that has been specified using the detection pattern and the action of the target to be monitored that has been specified by the camera image.

8. The optical fiber sensing system according to claim 1, further comprising a camera capable of capturing an image of the target to be monitored, wherein the action specifying unit is configured to point the camera at the target to be monitored based on the action of the target to be monitored that has been specified using the detection pattern.

9. An action specifying apparatus comprising:

a reception unit configured to receive, from at least one optical fiber included in a cable, an optical signal on which a vibration detected on the cable is superimposed; and an action specifying unit configured to specify, based on the optical signal, a location on the cable in which the vibration has been detected and specify an action of a target to be monitored which has caused the vibration, wherein the action specifying unit is configured to specify a detection pattern that is used to specify the action of the target to be monitored depending on the environment of the location on the cable in which the vibration has been detected, wherein the cable includes a plurality of cables laid down in a plurality of environments different from one another, wherein the action specifying apparatus includes a plurality of reception units that are provided in such a way that the plurality of reception units correspond to the plurality of respective cables and each reception unit is configured to receive the optical signal from a corresponding one of the respective cables, and wherein the action specifying unit is configured to specify the environment of the location in which the vibration has been detected depending on by which one of the reception units the optical signal on which the vibration is superimposed has been received.

10. The action specifying apparatus according to claim 9, wherein the action specifying unit is configured to specify the detection pattern depending on whether the location on the cable in which the vibration has been detected is above the ground or in the ground.

11. The action specifying apparatus according to claim 9, wherein the vibration has a unique pattern in accordance with the action of the target to be monitored, wherein the action specifying unit is configured to remove a noise pattern from a unique pattern that the vibration has, and performs matching between a unique pattern after the noise pattern has been removed and an action model pattern, thereby specifying the action of the target to be monitored, and wherein the action specifying unit is configured to specify the action model pattern as the detection pattern depending on the environment of the location on the cable in which the vibration has been detected.

12. The action specifying apparatus according to claim 9, wherein the vibration has a unique pattern in accordance with the action of the target to be monitored,
   wherein the action specifying unit is configured to remove a noise pattern from a unique pattern that the vibration has, and performs matching between a unique pattern after the noise pattern has been removed and an action model pattern, thereby specifying the action of the target to be monitored, and
   wherein the action specifying unit is configured to specify the noise pattern as the detection pattern depending on the environment of the location on the cable in which the vibration has been detected.

13. The action specifying apparatus according to claim 9, wherein the action specifying unit is configured to hold a table in which a location on the cable and the environment of this location are associated with each other, and
   wherein the action specifying unit is configured to compare the location on the cable in which the vibration has been detected with the table, thereby specifying the environment of the location in which the vibration has been detected.

14. The action specifying apparatus according to claim 9, wherein the vibration has a unique pattern in accordance with the action of the target to be monitored, and
   wherein the action specifying unit is configured to specify the action of the target to be monitored using a unique pattern in accordance with the action of the target to be monitored, the unique pattern is included in the vibration detected at each of a plurality of locations on the cable.

15. The action specifying apparatus according to claim 9, wherein the action specifying unit is configured to specify the action of the target to be monitored using a camera image captured by a camera capable of capturing an image of the target to be monitored, and
   wherein the action specifying unit is configured to determine consistency between the action of the target to be monitored that has been specified using the detection pattern and the action of the target to be monitored that has been specified by the camera image.

16. The action specifying apparatus according to claim 9, wherein the action specifying unit is configured to point a camera capable of capturing an image of the target to be monitored at the target to be monitored based on the action of the target to be monitored that has been specified using the detection pattern.

* * * * *